(12) United States Patent
Magee

(10) Patent No.: US 6,522,494 B1
(45) Date of Patent: Feb. 18, 2003

(54) APPARATUS AND METHOD FOR WRITING SERVO PATTERNS ON A COMPUTER HARD DISK

(75) Inventor: David P. Magee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/409,628

(22) Filed: Sep. 30, 1999

(51) Int. Cl.[7] ............................................. G11B 21/02
(52) U.S. Cl. ........................................................ 360/75
(58) Field of Search ...................... 360/75, 51, 77.06, 360/78.12, 78.05, 294.3, 294.6, 246.6, 77.03

(56) References Cited

U.S. PATENT DOCUMENTS

| | | | |
|---|---|---|---|
| 5,010,430 A | * | 4/1991 | Yamada et al. ...... 360/246.6 X |
| 5,012,363 A | | 4/1991 | Mine et al. |
| 5,325,244 A | * | 6/1994 | Takano et al. ........... 360/77.03 |
| 5,485,322 A | * | 1/1996 | Chainer et al. ................ 360/51 |
| 5,570,247 A | | 10/1996 | Brown et al. |
| 5,612,833 A | | 3/1997 | Yarmchuk et al. |
| 5,659,436 A | | 8/1997 | Yarmchuk et al. |
| 5,745,319 A | * | 4/1998 | Takekado et al. ......... 360/78.05 |
| 5,793,554 A | | 8/1998 | Chainer et al. |
| 5,793,559 A | | 8/1998 | Shepherd et al. |
| 5,844,742 A | | 12/1998 | Yarmchuk et al. |
| 5,875,064 A | | 2/1999 | Chainer et al. |
| 6,078,476 A | * | 6/2000 | Magee et al. ............ 360/294.3 |

* cited by examiner

Primary Examiner—David Hudspeth
Assistant Examiner—K. Wong
(74) Attorney, Agent, or Firm—J. Dennis Moore; W. James Brady, III; Frederick J. Telecky, Jr.

(57) ABSTRACT

A method for writing servo patterns on a hard disk drive disk in a hard disk drive assembly. The assembly includes a disk having at least one magnetic surface in which a reference pattern has been written, determining a reference track. Also included is an actuator having a shaft engaged with the disk to provide rotational motion to the disk, an actuator arm, and a micro-actuated read/write head mounted on the actuator arm. The method includes the following steps. First, the read/write head is used to position the actuator arm at a first fixed position over the reference track. The actuator arm is maintained at the first fixed position while the read/write head is used to write a second servo pattern, determining a second track. The read/write head is used to position the actuator arm at a second fixed position over the second track. Then, the actuator arm is maintained at the second fixed position while the read/write head is used to write a third servo pattern.

16 Claims, 3 Drawing Sheets

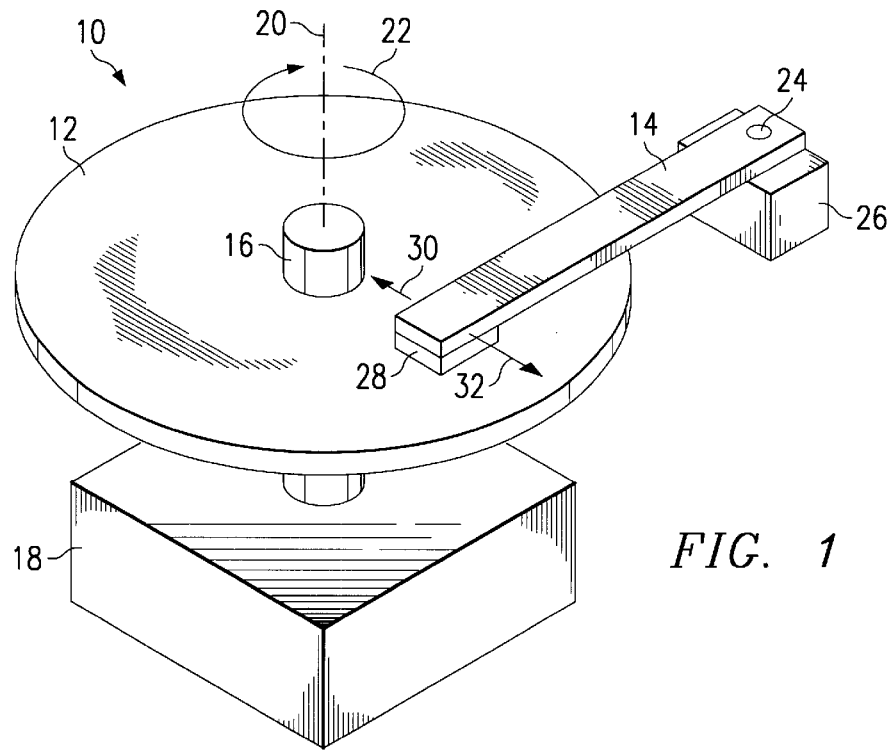
FIG. 1
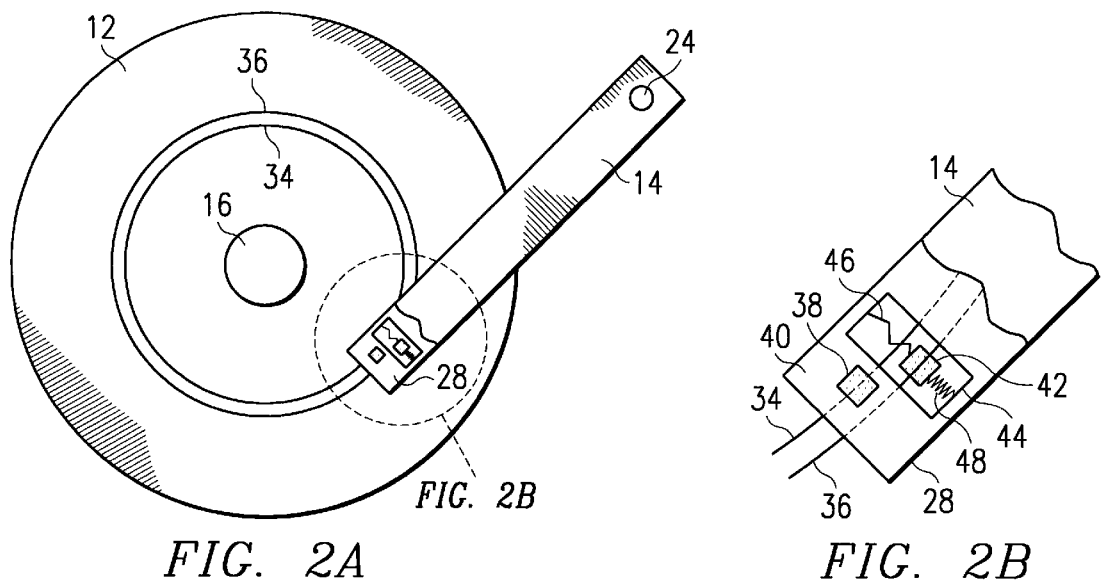
FIG. 2A
FIG. 2B
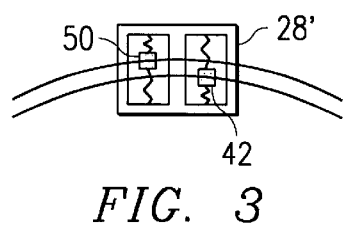
FIG. 3

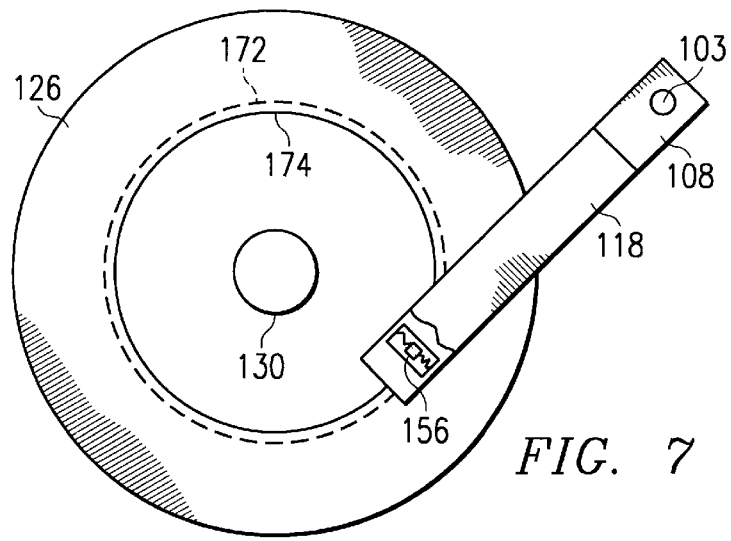
FIG. 7
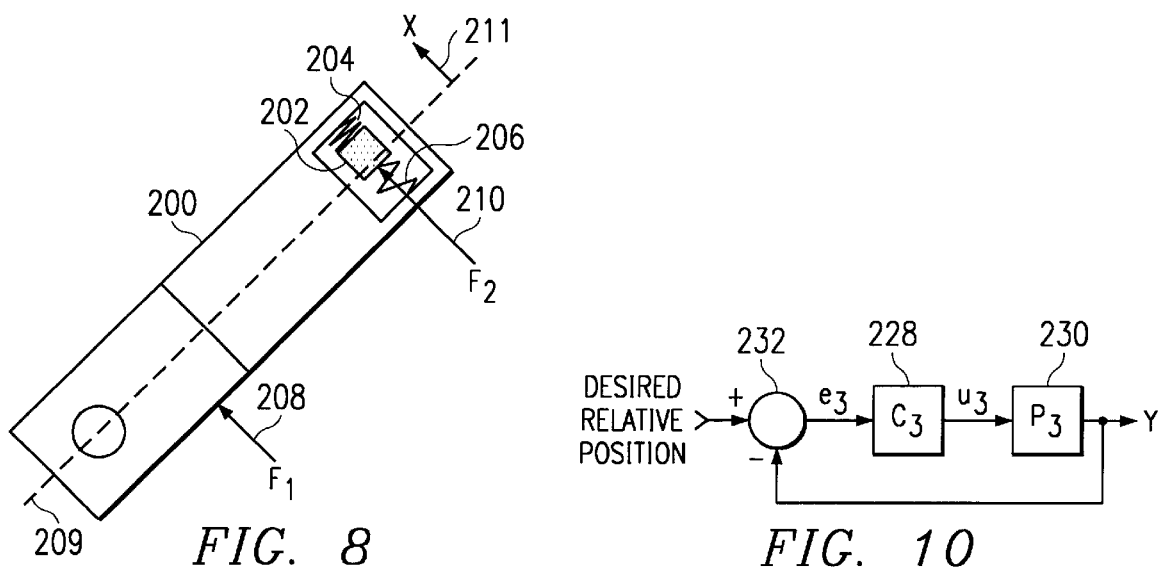
FIG. 8
FIG. 10
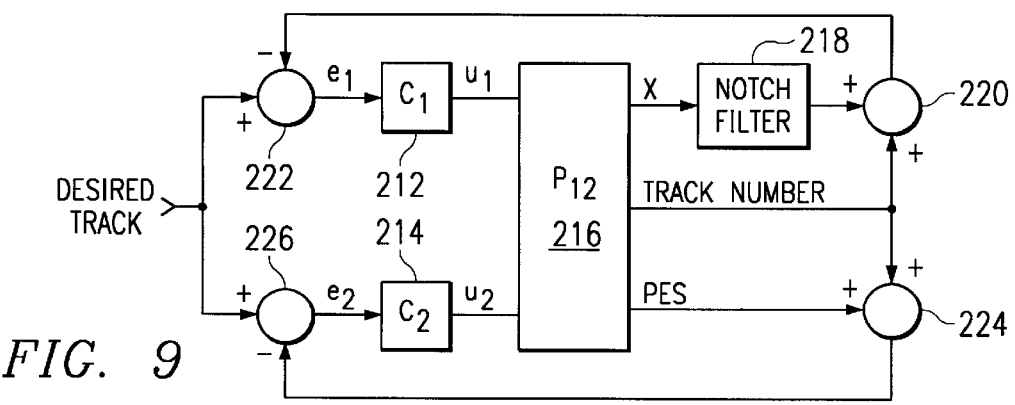
FIG. 9

APPARATUS AND METHOD FOR WRITING SERVO PATTERNS ON A COMPUTER HARD DISK

TECHNICAL FIELD OF THE INVENTION

This invention relates to computer hard disk drives, and more particularly relates to apparatus and methods for writing servo patterns on a hard disk.

BACKGROUND OF THE INVENTION

In computer hard disk drives an arrangement of so-called servo patterns is magnetized into the disk prior to the time a user is to use the drive to store data. These servo patterns are arrayed as fields throughout the disk, typically one servo field in each sector of each track. Data are recorded on the tracks in the segments between the servo fields.

The servo fields have a predetermined pattern of magnetization, typically in the form of the well known A, B, C, D burst patterns. When the disk drive is initialized, the head performs a seek operation over these servo fields. When the servo fields are located, the predetermined pattern is used by the servo system of the disk drive to center the head on a particular track so that data may be written to and read from the disk with the required precision.

Servo patterns are currently written to the disk with a machine called a servo writer. The way in which the servo writer operates is as follows. Near the end of the manufacturing process, each hard disk is placed in the servo,writer to embed the servo patterns onto each platter in the drive. Through a hole in the side of the hard disk drive base plate, a laser measurement system determines the precise location of the read/write head. This position information is fed into a control system that positions the read/write head at the correct location for each stage of the servo pattern writing process. Since the A, B, C, D burst patterns for adjacent tracks are interlaced, the read/write head must make several passes to write the servo pattern for each track. This servo pattern writing process is very time consuming, due to the fact that the process must be repeated for each track on both sides of each platter in the hard disk drive.

The servo writer is an expensive piece of equipment, with the current cost being in the range of $300,000. This cost is added to manufacturing cost. In addition, the servo writer can only operate on one hard disk at a time, which slows the manufacturing time and further increases manufacturing cost. Now, the number of concurrent assembly lines in a hard disk drive manufacturing plant determines the capital cost. However, it is believed that the manufacturing time taken to write the servo pattern in each drive constitutes an even larger cost.

If the writing of servo patterns could become a parallel manufacturing process, the cost of writing servo patterns could be significantly reduced. In addition, if the servo writer could be eliminated altogether, such costs could be reduced even more.

Attempts have been made to provide automated servo pattern writing. One example is found in U.S. Pat. No. 5,012,363, which issued to Shingi Mine et al., on Apr. 30, 1991, and which was assigned to International Business Machines Corporation. However, the technique described in this patent requires that one disk be written with a servo pattern prior to the assembly of the disk drive unit, i.e., by an external servo writer unit. In addition, the invention calls for the same head to be used for both reads and writes.

Another prior art attempt is described in U.S. Pat. No. 5,570,247, which issued to Dana H. Brown et al., on Oct. 29, 1996, and was assigned to International Business Machines Corporation. However, the technique described in this patent is similar to that described in the '363patent, and suffers the same limitations.

Another prior art attempt is described in U.S. Pat. No. 5,612,833, which issued to Edward J. Yarmchuk et al., on Mar. 18, 1997, and was assigned to International Business Machines Corporation. However, the technique described in this patent is similar to that described in the '363 and '247 patents. In addition, this technique requires the storage of reference values for the position error signal ("PES") offset in a lookup table. For servo writing, it calls for use of a proportional, integral, derivative ("PID") servo loop having a closed loop gain of less than one at integer multiples of the spindle frequency.

Another prior art attempt is described in U.S. Pat. No. 5,793,554, which issued to Timothy Chainer et al., on Aug. 11, 1998, and was assigned to International Business Machines Corporation. However, the technique described in this patent is similar to that described in the '436, but adds a correction component to the stored lookup table value.

Another prior art attempt is described in U.S. Pat. No. 5,793,559, which issued to Stanley H. Shepherd et al., on Aug. 11, 1998, and was assigned to Quantum Corporation. However, the technique described in this patent attempts to make servo pattern error corrections at data read/write, based on error data recorded after servo write.

Another prior art attempt is described in U.S. Pat. No. 5,844,742, which issued to Edward John Yarmchuk et al., on Dec. 1, 1998, and was assigned to International Business Machines Corporation. However, the technique described in this patent is similar to that described in the '833 and '436 patents, but adds the disclosure of adjusting the nominal servo loop reference value by 2/3 of the A=D servo position, due to the use of separate read and write heads, to align the write head during servo writing. Also, the effects of TMR are reduced by adjusting the write time of the burst pattern.

Another prior art attempt is described in U.S. Pat. No. 5,875,064, which issued to Timothy Chainer et al., on Feb. 23, 1999, and was assigned to International Business Machines Corporation. However, the technique described in this patent is similar to that described in the '436, adding a refinement.

The present invention overcomes the limitations of the prior art.

SUMMARY OF THE INVENTION

The present invention provides, according to one aspect, a method for writing servo patterns on a disk in a hard disk drive assembly. The assembly includes a disk having at least one magnetic surface in which a reference pattern has been written, determining a reference track. Also included is an actuator having a shaft engaged with the disk to provide rotational motion to the disk, an actuator arm, and a micro-actuated read/write head mounted on the actuator arm. The method includes the following steps. First, the read/write head is used to position the actuator arm at a first fixed position over the reference track. The actuator arm is maintained at the first fixed position while the read/write head is used to write a second servo pattern, determining a second track. The read/write head is used to position the actuator arm at a second fixed position over the second track. Then, the actuator arm is maintained at the second fixed position while the read/write head is used to write a third servo pattern.

According to another aspect of the present invention, there is provided a method for writing servo patterns on a disk in a hard disk drive assembly, wherein the assembly includes a disk, rotatable about a central axis thereof, having at least one magnetic surface. Also included is an actuator having a shaft engaged with the disk to provide rotational motion to the disk about the central axis. An actuator arm is provided, capable of lateral movement across the surface of the disk for positioning over substantially circular tracks thereon. A micro-actuated read/write head is provided on the actuator arm. A mechanical stop is also included for restraining the actuator arm from lateral movement at a predetermined reference position. The method according to this aspect includes the following steps. First, the actuator arm is positioned at the predetermined reference position against the mechanical stop. The actuator arm is maintained at the predetermined reference position while the read/write head is used to write a reference servo pattern, determining a reference track. The read/write head is used to position the actuator arm at a first fixed position over the reference track. The actuator arm is maintained at the first fixed position while the read/write head is used to write a second servo pattern determining a second track. The read/write head is used to position the actuator arm at a second fixed position over the second track. Then, the actuator arm is maintained at the second fixed position while the read/write head is used to write a third servo pattern.

According to a further aspect of the present invention, there is provided a method for writing servo patterns on a plurality of disks in a hard disk drive assembly, wherein the assembly includes a plurality of disks, each having at least one layer of magnetic medium on a surface thereof to form a magnetic surface. The assembly also includes an actuator having a shaft engaged with the disks to provide rotational motion to the disks. Also included in the assembly is a plurality of actuator arms, one associated with each of the magnetic surfaces, and a micro-actuated read/write head on each of the actuator arms. The method includes the following steps. First, a reference servo pattern is written, determining a reference track in at least one of the magnetic surfaces using a write apparatus external to the hard disk drive. A first read/write head of a first actuator arm is used to position the first actuator arm at a first fixed position over the reference track. The first actuator arm is maintained at the first fixed position while a second read/write head of a second actuator arm is used to write a second servo pattern determining a second track.

According to still another aspect of the invention there is provided a method for writing servo patterns on a plurality of disks in a hard disk drive assembly, the assembly including a plurality of disks, each having at least one layer of magnetic medium on a surface thereof to form a magnetic surface. The assembly also includes an actuator having a shaft engaged with the disks to provide rotational motion to the disks, a plurality of actuator arms, one associated with each of the magnetic surfaces, and a micro-actuated read/write head on each of the actuator arms. A mechanical stop is included for restraining a first one of the actuator arms from lateral movement at a predetermined reference position. The method includes the following steps. The first one of the actuator arms is positioned at the predetermined reference position against the mechanical stop. The first one of the actuator arms is maintained at the predetermined reference position while using the read/write head on the first one of the actuator arms to write a reference servo pattern, determining a reference track. The read/write head of the first one of the actuator arms is used to position the first actuator arm at a first fixed position over the reference track. Then, the first actuator arm is maintained at the first fixed position while a read/write head of a second actuator arm is used to write a second servo pattern determining a second track.

According to yet another aspect of the present invention, there is provided a method for writing servo patterns on a disk, including the following steps. A disk is provided, having at least one magnetic surface in which a reference pattern for a reference track has been written. An actuator is provided, having a shaft engaged with the disk to provide rotational motion to the disk. An actuator arm is provided, as is a dual read/write head assembly on the actuator arm having a first head having at least read capability, and having a second, micro-actuated head having read/write capability. The first head is used to position the actuator arm at a first fixed position with the first head over the reference track. The first head is used to maintain the actuator arm at the first fixed position while the second head is used to write a second servo pattern determining a second track. The second head is used to write further servo patterns determining further tracks. The first head is used to position the actuator arm over a track determined by one of the servo patterns written by the second head. Then, the second head is used to write further servo patterns determining further tracks.

According to still another aspect of the invention there is provided a method for writing servo patterns on a disk in a hard disk drive assembly, the assembly including a disk, rotatable about a central axis thereof, having at least one magnetic surface. Also included is an actuator having a shaft engaged with the disk to provide rotational motion to the disk about the central axis. An actuator arm is included, capable of lateral movement across the surface of the disk for positioning over substantially circular tracks thereon. A dual read/write head assembly is included on the actuator arm having a first head having at least read capability, and a second, micro-actuated head having read/write capability. A mechanical stop is also included, for restraining the actuator arm from lateral movement at a predetermined reference position. The method includes the following steps. The actuator arm is positioned at the predetermined reference position against the mechanical stop. The actuator arm is maintained at the predetermined reference position while the first head is used to write a reference servo pattern, determining a reference track. The first head is used to position the actuator arm at a first fixed position with the first head over the reference track. Then, the first head is used to maintain the actuator arm at the first fixed position while the second head is used to write a second servo pattern determining a second track. The first head is used to position the actuator arm at a second fixed position with the first head over the second track. Then, the first head is used to maintain the actuator arm at the second fixed position while the second head is used to write a third servo pattern.

According to still another aspect of the invention there is provided a method for writing servo patterns on a plurality of disks in a hard disk drive assembly, wherein the assembly includes a plurality of disks, each having at least one layer of magnetic medium on a surface thereof to form a magnetic surface. Also included is an actuator having a shaft engaged with the disks to provide rotational motion to the disks. A plurality of actuator arms are provided in fixed spatial relation with respect to one another, one associated with each of the magnetic surfaces. A dual read/write head is mounted on each of the actuator arms, each of the dual read/write heads having a first head having at least read capability, and having a second, micro-actuated head having read/write capability. The method includes the following steps. A reference servo pattern is written, determining a reference track in at least one of the layers of magnetic medium, using a write apparatus external to the hard disk drive. A first head of a first actuator arm is positioned over the reference track, and a second head of one of the actuator arms is positioned at a position suitable for writing a second servo pattern determining a second track on one of the layers of magnetic medium. The second servo pattern is written. The second head is positioned at additional positions for the writing of further servo patterns determining further tracks in the layers of magnetic medium and writing the further servo patterns. The first head is positioned over a track determined by the servo patterns written by the second head. Then, a second head of one of the actuator arms is positioned at additional positions for the writing of further servo patterns and writing the further servo patterns.

According to still another aspect of the invention there is provided a method for writing servo patterns on a plurality of disks in a hard disk drive assembly, the assembly including a plurality of disks, each having at least one layer of magnetic medium on a surface thereof to form a magnetic surface. The assembly also includes an actuator having a shaft engaged with the disks to provide rotational motion to the disks, and a plurality of actuator arms in fixed spatial relation with respect to one another, one associated with each of the magnetic surfaces. A dual read/write head is included on each of the actuator arms, each of the read/write heads having a first head having at least read capability, and having a second, micro-actuated head having read/write capability. A mechanical stop is included, for restraining a first one of the actuator arms from lateral movement at a predetermined reference position. The method includes the following steps. First, the first one of the actuator arms is positioned at the predetermined reference position against the mechanical stop. The first one of the actuator arms is maintained at the predetermined reference position while using a first head of one of the actuator arms to write a reference servo pattern, determining a reference track. The first head of the one of the actuator arms is positioned over the reference track. A second head of one of the actuator arms is positioned at a position suitable for writing a second servo pattern determining a second track on one of the layers of magnetic medium. The second servo pattern is written. The second head is positioned at additional positions for the writing of further servo patterns determining further tracks in the layers of magnetic medium and writing the further servo patterns. A first head of one of the actuator arms is positioned over a track determined by the servo patterns written by the second head. A second head of one of the actuator arms is positioned at additional positions for the writing of further servo patterns and writing the further servo patterns.

These and other aspects and features of the invention will be apparent to those skilled in the art from the following detailed description of the invention, taken together with the accompanying drawings.

BRIEF DESCRIPTION OF THE DRAWINGS

FIG. 1 is a diagram showing the pertinent portions of a hard disk drive unit of a first preferred embodiment of the present invention;

FIG. 2A is a top view of the disk 12 and actuator arm 14 of FIG. 1;

FIG. 2B is a blow-up view of the read/write head subassembly 28 as seen in FIG. 2A;

FIG. 3 is a diagram showing another preferred embodiment of a read/write head assembly according to the present invention;

FIG. 7 is a diagram showing a bottom view of the disk 126 and actuator arm 118 of FIG. 5;

FIG. 8 is a diagram of an E-Block showing two forces applied in controlling a read/write head thereon;

FIG. 9 is a block diagram of a servo control system for a read/write head that is reading during a self servo-writing process according to an embodiment of the present invention; and FIG. 10 is a block diagram of a servo control system for a read/write head that is writing during a self servo-writing process according to an embodiment of the present invention.

DETAILED DESCRIPTION OF THE PREFERRED EMBODIMENT

Figure 4:
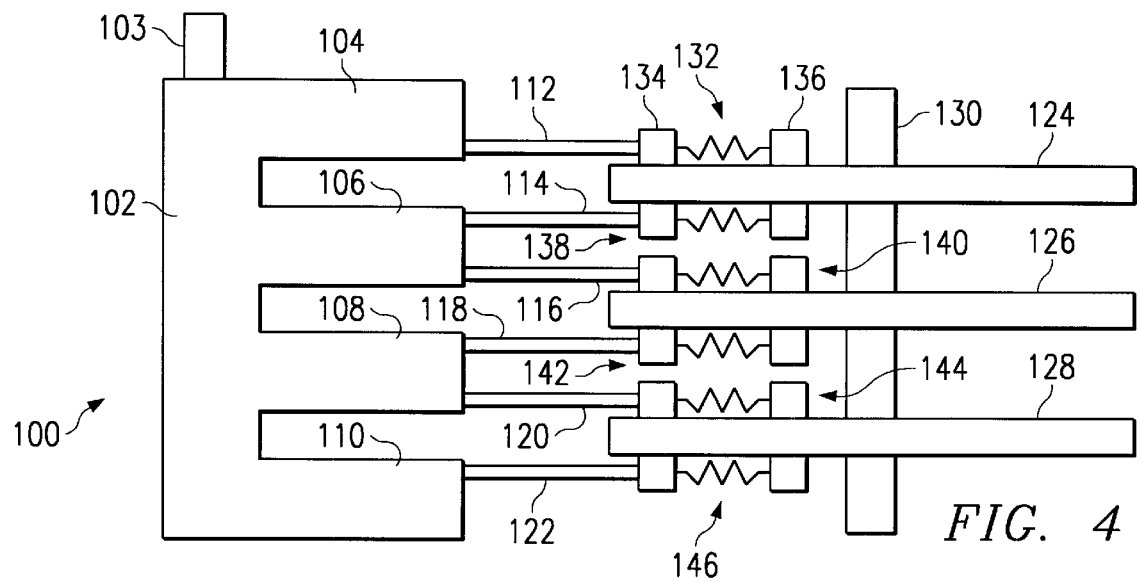
FIG. 4 is a diagram showing a side view of a hard disk drive unit with dual heads at the end of each actuator arm for a three platter system.

FIG. 1 shows the pertinent portions of a first preferred embodiment of the present invention, a hard disk drive unit 10 having a single disk 12 and having a single actuator arm 14. The disk is mounted on a shaft, or spindle 16 that engages the disk 12 through a central opening therein. The spindle 16 is coupled to an actuator, being a spindle motor 18 in this embodiment. Activation of the spindle motor 18 produces rotation of the disk about the spindle axis 20, as shown by arrow 22.

The actuator arm 14 is mounted on a pivot shaft 24 that is coupled to an actuator 26, such as a voltage controlled motor. Actuation of the actuator 26 is controlled to produce motion in the actuator arm 14 to move a read/write head subassembly 28 across the top surface of the disk 12, as shown by arrows 30 and 32, allowing the head to be positioned directly over a selected track on the disk 12. The entire assembly of the disk drive unit 10 is of conventional construction, with the exception of the read/write head 28. Details of the read/write head subassembly 28 relevant to the preferred embodiment of the present invention will now be described in conjunction with FIG. 2A and FIG. 2B.

FIG. 2A is a top view of the disk 12 and actuator arm 14 of FIG. 1. The location of two tracks 34 and 36 in the magnetic medium of the disk 12 are shown, as well as details of the read/write head subassembly 28. FIG. 2B is a blow-up view of the read/write head subassembly 28 as seen in FIG. 2A, and of a portion of the two tracks 34 and 3.6. As can be seen, the read/write head subassembly 28 is a dual head configuration. A first head 38, which is of conventional construction, is mounted on a head support frame 40, which is also of conventional construction. A second head 42 is disposed within an opening 44 in the head support frame 40, suspended by suspensions 46 and 48, as shown, and controlled by a micro-actuator (not shown). The construction of the second head 42, its suspensions 46 and 48, and associated micro-actuator, is conventional.

The first head 38 need only be a read element, but the second head 42 is a read/write element.

The operation of the read/write head subassembly 28 of FIGS. 2A and 2B is as follows. Before the servo burst pattern writing process begins, one reference servo burst pattern (hereinafter, simply "servo pattern") for a first track is written onto the disk 12. After the platter has been plated with magnetic material, this reference servo pattern may be written by a separate device, by bracing the arm and writing the pattern, or by using an existing servo writer. In FIGS. 2A and 2B track 34 is the track associated with the reference servo pattern. Then, the hard disk drive unit 10 is assembled.

Once the hard disk drive has been assembled, the drive is powered up and a control routine slowly moves the head from the parked position in search of the reference servo pattern. Since the park position for the read/write head assembly is near the inner diameter ("ID") of the disk, it is considered preferred to write the reference servo pattern near the ID. Once the reference servo pattern has been found, the first head 38 is positioned over the track 34. FIG. 2 shows the read/write head assembly 28 with the first head 38 so positioned. After this is accomplished, the control system (not shown) of the hard drive unit 10, under control of a control routine, causes the first head 38 to follow the reference track 34, i.e., remain positioned over the reference track 34, while the second head 42 writes a servo pattern for a new track 36.

The second head 42 writes as many servo patterns as possible, given the limit on the movement of the second head 42 perpendicular to the reference track 34. Once the limit of the motion of the second head 42 has been reached, then the first head 38 must be relocated to the track for the last servo pattern written by the second head 42, which is then used as the new reference track, as the control routine is repeated as before. The process repeats itself until all of the servo patterns have been written.

For current micro-actuator designs, the range of motion is approximately ±5 μm. Thus, depending on the location of the fixed head with respect to the micro-actuator, the servo patterns for up to ten tracks could be written before the actuator arm 14 would need to be repositioned, assuming a track density of 25 kTPI (25 thousand tracks per inch). As track densities increase, this range of motion will correspond to even more tracks.

FIG. 3 shows another preferred embodiment 28' of the read/write head assembly 28, having a configuration that permits extending the servo writing range from a given reference track. The head assembly 28' in FIG. 3 is like: the head assembly 28 in FIG. 2B, having a micro-actuator controlled head 42' corresponding to second head 42 in FIG. 2B, but the first head 38 has been replaced by a second micro-actuator controlled head 50. This effectively doubles the range of relative motion of the second head 42' relative to the first head 50, and so doubles the number of servo patterns that can be written for a given arm 14 position, i.e., before the actuator arm 14 needs to be repositioned during the servo pattern writing process.

The read/write head assembly configurations, and the method of using them described above, may be used in hard disk drive units wherein the disk has two surfaces coated with magnetic medium, and two associated actuator arms, and even in drive units having multiple disks, each having two actuator arms. In such units, once the servo patterns have been written to the first data surface, this surface can serve as the reference for the writing of the servo patterns on the remaining disk surfaces. FIG. 4 shows a side view of a hard disk drive unit 100 with dual heads at the end of each actuator arm for a three platter system. An E-Block 102 of conventional construction rotates on the pivot shaft 103 of a voltage controlled motor (not shown) has four support arms 104, 106, 108, 110, that support the actuator arms 112, 114, 116, 118, 120, 122, for the three disks 124, 126, 128. The disks 124, 126, 128, are mounted on a common spindle 130 providing them with rotational motion.

Actuator arm 112 has a dual read/write head assembly 132 comprising a first head 134 and a second head 136, both of which are micro-actuated, to provide the greatest range of motion. However, as in the first embodiment, the first head 134 may be fixed or micro-actuated, and need only be a read head. However, the second head 136 must be micro-actuated to complete the servo pattern writing process, and must have read/write capabilities. The read/write head assembly 132 provides read and write function for the top surface of disk 124.

The other actuator arms 114, 116, 118, 120, 122, have read/write head assemblies mounted on their ends, and are of the same construction as that of actuator arm 112. Actuator arm 114 and its associated dual read/write head assembly 138 provides read and write function for the bottom surface of disk 124. Actuator arm 116 and its associated dual read/write head assembly 140 provides read and write function for the top surface of disk 126. Actuator arm 118 and its associated dual read/write head assembly 142 provides read and write function for the bottom surface of disk 126. Actuator arm 120 and its associated dual read/write head assembly 144 provides read and write function for the top surface of disk 128. Actuator arm 122 and its associated dual read/write head assembly 146 provides read and write function for the bottom surface of disk 128.

Each of the disk surfaces can contain its own reference servo patterns, if required in order to achieve the desired track tolerances, given the mechanical and electrical limitations of a particular hard drive unit. However, most hard drive units marketed today have sufficient mechanical and electrical performance so that only that a single disk surface might be provided with an externally-supplied reference track, for example the top surface of disk 124. However, this invention may be applied such that the initial reference track can be written by using a bracing strategy, as described in detail below, so that no externally-supplied reference track need be provided.

When providing servo patterns in the case where both surfaces of all disks have an initial reference servo pattern provided, the writing of the remaining servo patterns for each surface proceeds as in the first embodiment, described above.

When providing the servo patterns for all disks in the case where only the first platter surface, e.g., the top surface of disk 124, has been written with an initial reference pattern for an initial reference track, the writing of the remaining servo patterns proceeds as follows. First, the remaining servo patterns for the top surface of disk 124 are all written. At that point, it contains reference tracks for the remaining surfaces. Thus, to write servo patterns on any other disk surface, first head 134 of the dual read/write head assembly 132 of actuator arm 112 is positioned over the initial reference track on the top surface of disk 124. Then, the actuator arm for the other disk surface to be written, e.g., actuator arm 114, has its position referenced to the position of actuator arm 112, in direct alignment with it. The second, micro-actuated read/write head of read/write head assembly 138 is then used to write as many servo patterns as possible with actuator arm 114 in that position. Then, actuator arm 112 is moved to position the first head 134 of the dual read/write head assembly 132 of actuator arm 112 over a new reference track, and the process repeats until.all of the servo patterns have been written onto the bottom surface of disk 124. The process is repeated for all remaining disk surfaces. Alternatively, the servo patterns on all disk surfaces may be' written in parallel, i.e., the servo patterns for the same track on each disk is written at the same time.

Since the location of a particular track's servo pattern is measured with respect to previous tracks' servo patterns, the position error for the servo patterns for a given disk drive unit is accumulative. For given mechanical and electrical limitations of a particular hard drive unit, this places a corresponding limit on the track density on the various disk surfaces. To provide greater track density, reference tracks may be located on each disk surface, as mentioned above. The reference tracks may also be placed at different radial locations so that multiple references exist at multiple locations. Such multiple references are used in the method described above in which, while the servo pattern is being written on one disk surface, the reference track is being read for a different disk surface. These different references are used for the writing of servo patterns on all disk surfaces for different sections of each disk. In this way the accumulation of error is broken up, so to speak, as a new reference is available for each radial area in which a reference exists.

Figure 5:
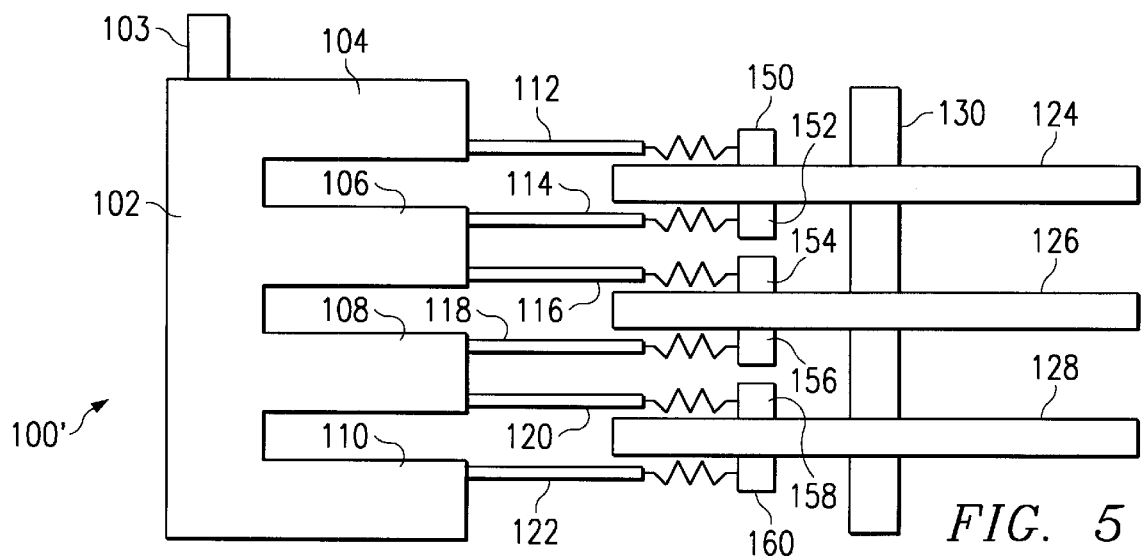
FIG. 5 is a diagram showing a side view of a hard disk drive unit with single micro-actuated heads at the end of each actuator arm for a three platter system.

Another embodiment of the present invention is shown in FIG. 5. FIG. 5 shows a side view of a hard disk drive unit 100' for a three platter system, which is similar to the hard disk drive unit 100 shown in FIG. 4. As in the unit 100 of FIG. 4, an E-Block 102 of conventional construction rotates on the pivot shaft 103 of a voltage controlled motor (not shown), and has four support arms 104, 106, 108, 110, that support actuator arms 112, 114, 116, 118, 120, 122, for the three disks 124, 126, 128. The disks 124, 126, 128, are mounted on a common spindle 130 providing them with rotational motion.

Different from the unit 100 of FIG. 4, however, actuator arm 112 has a read/write head assembly comprising not a dual head, but a single head 150 which is micro-actuated. Likewise, the other actuator arms 114, 116, 118, 120, 122, have read/write head assemblies mounted on their ends, and are of the same construction as that of actuator arm 112. Actuator arm 114 and its associated single read/write head assembly 152 provides read and write function for the bottom surface of disk 124. Actuator arm 116 and its associated single read/write head assembly 154 provides read and write function for the top surface of disk 126. Actuator arm 118 and its associated single read/write head assembly 156 provides read and write function for the bottom surface of disk 126. Actuator arm 120 and its associated single read/write head assembly 158 provides read and write function for the top surface of disk 128. Actuator arm 122 and its associated single read/write head assembly 160 provides read and write function for the bottom surface of disk 128.

As in the case of assembly 100, each of the disk surfaces can contain its own reference servo pattern, if required in order to achieve the desired track tolerances, given the mechanical and electrical limitations of a particular hard drive unit. However, as previously mentioned, most hard drive units marketed today have sufficient mechanical and electrical performance so that only that a single disk surface might be provided with an externally-supplied reference track, for example the top surface of disk 124, or a bracing strategy used so that no externally-supplied reference track need be provided at all. Furthermore, according to one method for servo pattern writing in accordance with the principles of the present invention, a mechanical stop may be used for the writing of a first reference servo pattern.

Figure 6:
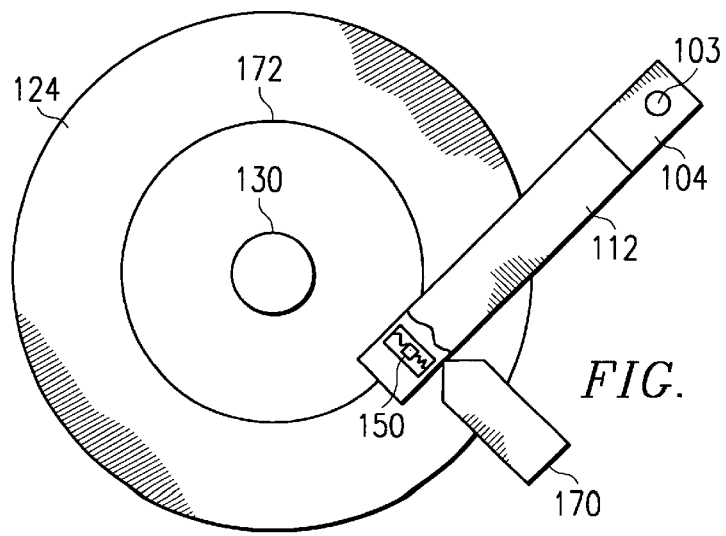
FIG. 6 is a diagram showing a top view of the disk 124 and actuator arm 112 of FIG. 5.

FIGS. 6 and 7 will now be used in explaining a method for servo pattern writing in which a mechanical stop is used for the writing of a first reference servo pattern for a first reference track. FIG. 6 shows pertinent portions of a top view of assembly 100' (FIG. 5), in particular showing the top of platter 124. The pivot shaft 103 is shown, as is support arm 104 and actuator arm 112, with its associated single read/write head 150 which is micro-actuated. It can be seen that the actuator arm 112 is resting against a mechanical stop 170 which braces the arm, i.e., holds the arm rigidly against lateral motion. The mechanical stop 170 may be retractable to a "parked" position (not shown) to prevent interference during normal operation of the assembly 100, while being capable of being moved to a position, where it may be rigidly fixed, so that the actuator arm 112 can be braced against the mechanical stop 170 for writing an initial, reference servo pattern. FIG. 6 shows the mechanical stop 170 in a position for writing a reference servo pattern in an approximately central location on the surface of the platter 124. However, it will be appreciated that the fixed position for the mechanical stop 170 may be at any location, permitting writing of the reference servo pattern anywhere on the surface of the platter 124.

Also note that the use.of a mechanical stop is not limited to a single head configuration. A mechanical stop my also be used in dual head configurations, where at least one of the two heads is micro-actuated. In such configurations, if one head is not micro-actuated, the non-micro-actuated head is preferably used for the writing of the reference servo pattern, as it will be completely free of any movement relative to the actuator arm on which it is mounted and which is braced against the mechanical stop. The writing of other servo patterns may then be done by the methods disclosed herein for dual head configurations.

Once the reference servo pattern is written for the first track, for example as shown in FIG. 6, other servo patterns for other tracks may be written on the same surface as that of the first track, or on other surfaces, for example on other platters. FIG. 7 shows pertinent portions of another view of assembly 100' (FIG. 5), in particular showing the bottom of platter 126. The reference servo pattern for track 172 that was written onto the top surface of platter 124 is used to position the actuator arm 112, thus positioning the E-Block 102 (FIG. 5) and, consequently, the support arm 108 and the actuator arm 118 for the bottom surface of platter 126. The servo system for controlling the position of the E-Block holds the actuator arms with sufficient freedom from movement to permit these subsequent servo pattern writings, as is described in more detail below. The actuator arm 118 having been thus appropriately positioned, its associated micro-actuated single read/write head 150 may then be moved to any servo pattern position within its range and another servo pattern 174 be written. As many servo patterns as may be written within the micro-actuator range of motion are then written. Once these servo patterns are written, any track determined by them may be used as a reference track to fix the E-Block into a new position, and other servo patterns may th en be written on other platter surfaces, and the process repeated until all servo patterns are written onto all platter surfaces.

Implementation of servo control of the arm or E-Block and of the micro-actuator head will now be described. Referring now to FIG. 8, there is shown a representation of an E-Block 200, which may be the E-Block 102 of FIG. 5 or FIG. 6, for example, which includes a micro-actuator read/write head 202 held by suspensions 204 and 206.

Arrow 208 represents $F_1$, which denotes the force/torque generated by the large actuator (not shown) controlling the motion of the E-Block 200 as a result of control signal $u_1$. This large actuator will be referred to in the following discussion as actuator 1. The purpose of the force $F_1$ is to position the E-Block 200.

Arrow 210 represents $F_2$, which denotes the force/torque generated by the micro-actuator (not shown) controlling the motion of the read/write head 202 as a result of control signal $u_2$. This micro-actuator will be referred to in the following discussion as actuator 2. The purpose of the force $F_2$ is to position the read/write head 202.

Now, referring to FIG. 9, there is shown a block diagram of a control system for a read/write head on an E-Block, such as shown in FIG. 8, that is reading during the self servo-writing process. The function of this control system is to keep the E-block "fixed" in inertial space (i.e. it does not move) so that a write head on another surface can write several servo patterns. How this function is accomplished will now be discussed.

Block 212, labeled $C_1$, denotes a control system that takes an error signal $e_1$ as its input and produces a control signal $u_1$ as its output. Block 214, labeled $C_2$ denotes a control system that takes an error signal $e_2$ as its input and produces a control signal $u_2$ as its output.

Block 216, labeled $P_{12}$ denotes a model of the read head subsystem in the servo-writing process with inputs $u_1$ and $u_2$ and outputs X, Track Number and PES.

The Desired Track denotes the desired track location of the read head. X as shown by line 211 in FIG. 8 denotes the position of the micro-actuator with respect to the centerline 209 of the E-Block 200. The Track Number denotes the closest track to the read head. PES denotes the Position Error Signal of the read head with respect to the closest track.

The control system $C_1$ for the large actuator, actuator 1, is a relatively low bandwidth control loop. The bandwidth should not be too low, as performance would then be unnecessarily degraded, nor too high, since mechanical resonances could then destabilize the system. A desirable range for typical modern hard drive assemblies is approximately 200 to 800 Hz, although the actual range will depend on the mechanical characteristics of the hard drive assembly, and can be readily determined by those of ordinary skill in the art. A good intermediate bandwidth selection for typical modern hard drive assemblies is 500 Hz. In any event, this low bandwidth control loop is responsible for driving e, to zero. By driving $e_1$ to zero, X has indirectly been driven to zero. Therefore, the control system keeps the micro-actuator centered over the desired track. There are many ways to design $C_1$ which are well known to those skilled in the art. Selection of the particular implementation of control system $C_1$ is not considered critical to the design. However, any such implementation should observe the relatively low bandwidth parameter, for the reasons mentioned above in this paragraph.

The control system $C_2$ for the micro-actuator, actuator 2, is a relatively high bandwidth control loop in order to provide adequate responsiveness to respond to the small deviations in the track that read/write head 202 is tracking. For typical modern hard drive assemblies the bandwidth limit is probably be determined by the available processor power, and may be approximately 5,000 Hz. A good intermediate bandwidth selection for typical modern hard drive assemblies is 2000 Hz. However, in the future as available processing power increases, the limit for the bandwidth of this control loop may increase to the point where, as before, they are determined by stability concerns due to mechanical resonances. In any event, this relatively high bandwidth control loop is responsible for driving PES to zero. Therefore, it keeps read/write head 202 centered over the desired track. Selection of the particular implementation of control system $C_2$ is not considered critical to the design. However, any such implementation should observe the relatively high bandwidth parameter, for the reasons mentioned above in this paragraph.

Since PES is measured relative to servo patterns already written on the disk, this signal will contain any position errors resulting from the incorrect location of the servo patterns in inertial space. However, these errors are repeated at the spin frequency of the disk and are substantially eliminated with a notch filter 218. The frequency of the filter is determined by the spin rate of the disk. The Q of the filter is relatively high, so as to avoid undue degradation of the actuator 1 control loop stability. On the other hand, the Q of the filter should be low enough so that the resonances fall within the desired attenuation range, given the accuracy of knowledge of the frequency of those resonances. A desirable Q range is approximately 0.5 to 50, with a good intermediate value being 25. In any event, the relative position signal of the micro-actuator is filtered by the notch filter 218 before it is used to compute the error signal $e_1$. By filtering the micro-actuator position signal X in this way, the control system for the large actuator will not respond to the periodic errors in the location of the bursts constituting the servo pattern and cause the E-block to move needlessly.

As can be seen in FIG. 9, the filtered micro-actuator position signal X is provided to an addition input of a summing node 220 as is the Track Number output of the read head subsystem 216. The output of summing node 220, representing the sum of these two signals, is provided to a subtraction input of a summing.node 222. The Desired Track signal is provided to an addition input of summing node 222, and the output of summing node 222, representing the difference between these two signals, is provided to the input of control system $C_1$.

As can be seen in FIG. 9, the PES signal is provided to an addition input of a summing node 224 as is the Track Number output of the read head subsystem 216. The output of summing node 222, representing the sum of these two signals, is provided to a subtraction input of a summing node 226. The Desired Track signal is provided to an addition input of summing node 226, and the output of summing node 226, representing the difference between these two signals, is provided to the input of control system $C_2$.

Referring now to FIG. 10, there is shown a control block diagram for a control system for a read/write head on an E-Block, such as shown in FIG. 8, that is writing during the self servo-writing process. The function of this control system is to keep the write head at the desired relative position so that servo patterns can be written. This control system moves the write head over the full range of motion for the micro-actuator. Since the E-block is kept substantially motionless by the first control system, the relative positioning accuracy of the write head is dictated by the positioning sensing mechanism used in the micro-actuator itself. Therefore, the effective track density of the drive is controlled by how well the micro-actuator can be positioned.

Block 228, labeled $C_3$ denotes a control system that takes an error signal $e_3$ as its input and produces a control signal $u_3$ as its output.

Block 230, labeled $P_3$ denotes a model of the write head subsystem in the servo-writing process with input $u_3$ and output Y, the relative position of the micro-actuator with respect to the actuator arm. It is the same relative measurement as X in FIG. 8.

The control system $C_3$ for this micro-actuator is a relatively high bandwidth control loop (~2000 Hz), wherein the considerations for bandwidth selection are essentially the same as those for the control system $C_2$ of FIG. 9. This control loop is responsible for driving $e_3$ to zero. Therefore, it keeps the read head at the desired offset required to write a particular portion of a servo pattern. Once a particular portion of a servo pattern has been written, a new desired relative position is commanded that corresponds to the next portion of the servo pattern. Once the head has been repositioned, the next portion of the servo-pattern is written. This process is repeated for the entire range of motion for the micro-actuator. Selection of the particular implementation of control system $C_3$ is not considered critical to the design. However, any such implementation should observe the relatively high bandwidth parameter, for the reasons mentioned above in this paragraph.

At some point the range of travel for the write head will be reached, and, consequently, no more servo patterns can be written by that write head with the E-Block fixed at that position. When this occurs, the head that was writing during the servo-writing process becomes the read head to keep the E-block fixed and the head that was reading during the servo-writing process becomes the write head. So, the control systems for each head swap to the corresponding read or write function. This process is repeated until two sides of a disk have been written with a particular servo pattern. Then the track for one of these servo patterns becomes the position reference to write the servo pattern on the remaining disk surfaces.

Thus, in summary, by writing one reference track servo pattern, a method is provided for writing the servo patterns for an entire hard disk drive unit without using a servo writer. The method can begin by using one reference track on the first disk surface to write the remaining servo patterns on that surface. Once this process is complete, the tracks on that surface may serve as the reference tracks for writing the servo patterns on the remaining disk surfaces. Or, the writing on all disk surfaces may be done in parallel. Plural reference tracks may also be provided, spaced radially, and they may be on different disk surfaces. The reference pattern or patterns may be written using an external writer, or by bracing an arm and writing the reference pattern or patterns using a read/write head on the braced arm or all arms. A micro-actuated head is used to provide a range of motion to write a plurality of servo patterns while an actuator arm is held in position over a track that is used as a reference. Note that "micro-actuated" head is a term intended to encompass both micro-actuated heads such as described herein, as well as arrangements wherein an E-Block is provided, and the individual arms are themselves actuated with respect to the E-Block, for example by a piezoelectric actuator. Such arrangements are sometimes referred to as milli-actuators, but such arrangements are intended to be encompassed by the term micro-actuator, or micro-actuated, as used herein. Savings in manufacturing costs of hard disk drive units can be substantial using the present invention.

Although the present invention and its advantages have been described in detail, it should be understood that various changes, substitutions and alterations can be made herein without departing from the spirit and scope of the invention as defined by the appended claims.

What is claimed is:

1. A method for writing servo patterns on a disk in a hard disk drive assembly, said assembly comprising
   a disk having at least one magnetic surface in which a reference pattern has been written, determining a reference track,
   an actuator having a shaft engaged with said disk to provide rotational motion to said disk,
   an actuator arm, and
   a micro-actuated read/write head on said actuator arm, comprising the steps of:
      using said read/write head to position said actuator arm at a first fixed position over said reference track;
      maintaining said actuator arm at said first fixed position while displacing said read/write head and using said displaced read/write head to write a second servo pattern, determining a second track displaced from said reference track;
      using said read/write head to position said actuator arm at a second fixed position over said second track; and
      maintaining said actuator arm at said second fixed position while displacing said read/write head and using said displaced read/write head to write a third servo pattern determining a third track displaced from said second track.

2. A method for writing servo patterns on a hard disk drive disk according to claim 1, further comprising the steps of
   using said read/write head to position said actuator arm at further fixed positions over previously written servo patterns determining previously written tracks; and
   maintaining said actuator arm at said further fixed positions while using said read/write head to write further servo patterns determining further tracks displaced from said previously written tracks.

3. A method for writing servo patterns on a disk in a hard disk drive assembly, said assembly comprising
   a disk, rotatable about a central axis thereof, having at least one magnetic surface,
   an actuator having a shaft engaged with said disk to provide rotational motion to said disk about said central axis,
   an actuator arm capable of lateral movement across said surface of said disk for positioning over substantially circular tracks thereon, and
   a micro-actuated read/write head on said actuator arm, and
   a mechanical stop for restraining said actuator arm from lateral movement at a predetermined reference position, comprising the steps of:
      positioning said actuator arm at said predetermined reference position against said mechanical stop;
      maintaining said actuator arm at said predetermined reference position while using said read/write head to write a reference servo pattern, determining a reference track;
      using said read/write head to position said actuator arm at a first fixed position over said reference track;
      maintaining said actuator arm at said first fixed position while displacing said read/write head and using said displaced read/write head to write a second servo pattern, determining a second track displaced from said reference track;
      using said read/write head to position said actuator arm at a second fixed position over said second track; and
      maintaining said actuator arm at said second fixed position while displacing said read/write head and using said displaced read/write head to write a third servo pattern determining a third track displaced from said second track.

4. A method for writing servo patterns on a hard disk drive disk according to claim 3, further comprising the steps of
   using said read/write head to position said actuator arm at further fixed positions over previously written servo patterns determining previously written tracks; and maintaining said actuator arm at said further fixed positions while using said read/write head to write further servo patterns determining further tracks displaced from said previously written tracks.

5. A method for writing servo patterns on a plurality of disks in a hard disk drive assembly, said assembly comprising a plurality of disks, each having at least one layer of magnetic medium on a surface thereof to form a magnetic surface, an actuator having a.shaft engaged with said disks to provide rotational motion to said disks, a plurality of actuator arms, one associated with each of said magnetic surfaces, and a micro-actuated read/write head on each of said actuator arms, comprising the steps of:

writing a reference servo pattern determining a reference track in at least one of said magnetic surfaces using a write apparatus external to said hard disk drive;

using a first read/write head of a first actuator arm to position said first actuator arm at a first fixed position over said reference track; and maintaining said first actuator arm at said first fixed position while displacing a second read/write head of a second actuator arm and using said displaced second read/write head to write a second servo pattern, determining a second track displaced from said reference track.

6. A method for writing servo patterns in accordance with claim 5, further comprising the step of:

maintaining said second actuator arm at a second fixed position over said second track while displacing a read/write head of another actuator arm and using said displaced read/write head to write a third servo pattern determining a third track displaced from said second track.

7. A method for writing servo patterns on a plurality of disks in a hard disk drive assembly, said assembly comprising a plurality of disks, each having at least one layer of magnetic medium on a surface thereof to form a magnetic surface, an actuator having a shaft engaged with said disks to provide rotational motion to said disks, a plurality of actuator arms, one associated with each of said magnetic surfaces, and a micro-actuated read/write head on each of said actuator arms, and a mechanical stop for restraining a first one of said actuator arms from lateral movement at a predetermined reference position, comprising the steps of:

positioning said first one of said actuator arms at said predetermined reference position against said mechanical stop;

maintaining said first one of said actuator arms at said predetermined reference position while using said read/write head on said first one of said actuator arms to write a reference servo pattern, determining a reference track;

using said read/write head of said first one of said actuator arms to position said first actuator arm at a first fixed position over said reference track; and maintaining said first actuator arm at said first fixed position while displacing a read/write head of a second actuator arm and using said displaced read/write head to write a second servo pattern determining a second track displaced from said reference track.

8. A method for writing servo patterns on a disk in a hard disk drive assembly, said assembly comprising:

a disk having at least one magnetic surface in which a reference pattern for a reference track has been written, an actuator having a shaft engaged with said disk to provide rotational motion to said disk, an actuator arm, and a dual read/write head assembly on said actuator arm having a first head having at least read capability, and having a second, micro-actuated head having read/write capability, comprising the steps of:

using said first head to position said actuator arm at a first fixed position with said first head over said reference track;

using said first head to maintain said actuator arm at said first fixed position while using said second head to write a second servo pattern determining a second track displaced from said reference track;

while using said first head to maintain said actuator arm at said first fixed position, using said second head to write further servo patterns determining further tracks displaced from said reference track;

using said first head to position said actuator arm at a second fixed position over a track determined by one of said servo patterns written by said second head; and while using said first head to maintain said actuator arm at said second fixed position, using said second head to write further servo patterns determining further tracks displaced from said one of said servo patterns written by said second head.

9. A method for writing servo patterns on a disk in a hard disk drive assembly, said assembly comprising a disk, rotatable about a central axis thereof, having at least one magnetic surface, an actuator having a shaft engaged with said disk to provide rotational motion to said disk about said central axis, an actuator arm capable of lateral movement across said surface of said disk for positioning over substantially circular tracks thereon, a dual read/write head assembly on said actuator arm having a first head having at least read capability, and a second, micro-actuated head having read/write capability, and a mechanical stop for restraining said actuator arm from lateral movement at a predetermined reference position, comprising the steps of:

positioning said actuator arm at said predetermined reference position against said mechanical stop;

maintaining said actuator arm at said predetermined reference position while using said first head to write a reference servo pattern, determining a reference track;

using said first head to position said actuator arm at a first fixed position with said first head over said reference track;

using said first head to maintain said actuator arm at said first fixed position while displacing said second head and using said displaced second head to write a second servo pattern, determining a second track displaced from said reference track;

using said first head to position said actuator arm at a second fixed position with said first head over said second track; and maintaining said actuator arm at said second fixed position while displacing said second head and using said displaced second head to write a third servo pattern determining a third track displaced from said second track.

10. A method for writing servo patterns on a plurality of disks in a hard disk drive assembly, said assembly comprising a plurality of disks, each having at least one layer of magnetic medium on a surface thereof to form a magnetic surface, an actuator having a shaft engaged with said disks to provide rotational motion to said disks, a plurality of actuator arms in fixed spatial relation with respect to one another, one associated with each of said magnetic surfaces, and a dual read/write head on each of said actuator arms having a first head having at least read capability, and having a second, micro-actuated head having read/write capability, comprising the steps of:

writing a reference servo pattern determining a reference track in at least one of said layers of magnetic medium using a write apparatus external to said hard disk drive;

using a first head of a first actuator arm to position said first actuator arm at a first fixed position over said reference track;

while maintaining said first actuator arm at said first fixed position, positioning a second head of one of said actuator arms at a position suitable for writing a second servo pattern determining a second track on one of said layers of magnetic medium, said second track being displaced from said reference track;

writing said second servo pattern determining said second track;

positioning said second head at additional positions for the writing of further servo patterns, determining further tracks in said layers of magnetic medium, and writing said further servo patterns determining said further tracks displaced from said reference track;

using said first head to position said first actuator arm at a second fixed position over a temporary reference track determined by said servo patterns written by said second head; and while maintaining said first actuator arm at said second fixed position, positioning a second head of one of said actuator arms at additional positions for the writing of further servo patterns and writing said further servo patterns determining further tracks displaced from said temporary reference track.

11. A method for writing servo patterns on a plurality of disks in a hard disk drive assembly, said assembly comprising a plurality of disks, each having at least one layer of magnetic medium on a surface thereof to form a magnetic surface, an actuator having a shaft engaged with said disks to provide rotational motion to said disks, a plurality of actuator arms in fixed spatial relation with respect to one another, one associated with each of said magnetic surfaces, a dual read/write head on each of said actuator arms having a first head having at least read capability, and having a second, micro-actuated head having read/write capability, and a mechanical stop for restraining a first one of said actuator arms from lateral movement at a predetermined reference position, comprising the steps of:

positioning said first one of said actuator arms at said predetermined reference position against said mechanical stop;

maintaining said first one of said actuator arms at said predetermined reference position while using a first head of one of said actuator arms to write a reference servo pattern, determining a reference track;

using said first head of said one of said actuator arms to position said one of said actuator arms at a first fixed position over said reference track;.

while maintaining said one of said actuator arms at said first fixed position, positioning a second head of one of said actuator arms at a position suitable for writing a second servo pattern, determining a second track on one of said layers of magnetic medium displaced from said reference track;

writing said second servo pattern determining said second track;

positioning said second head at additional positions for the writing of further servo patterns determining further tracks in said layers of magnetic medium displaced from said reference track and writing said further servo patterns determining said further tracks;

using a first head of one of said actuator arms to position said one of said actuator arms at a second fixed position over a temporary reference track determined by said servo patterns written by said second head; and positioning a second head of one of said actuator arms at additional positions for the writing of further servo patterns determining further tracks displaced from said temporary reference track and writing said further servo patterns determining said further tracks.

12. A method for writing servo patterns on a disk in a hard disk drive assembly, said assembly comprising a disk having at least one recordable surface in which a reference pattern has been written, determining a reference track, an actuator having a shaft engaged with said disk to provide rotational motion to said disk, an actuator arm, and a micro-actuated read/write head on said actuator arm, comprising the steps of:

using said read/write head to position said actuator arm at a first fixed position over said reference track;

maintaining said actuator arm at said first fixed position while displacing said read/write head and using said displaced read/write head to write a second servo pattern, determining a second track displaced from said reference track.

13. A method for writing servo patterns on a hard disk drive disk according to claim 12, further comprising the step of maintaining said actuator arm at said first fixed position while displacing said read/write head and using said displaced read/write head to write a third servo pattern determining a third track displaced from said reference track.

14. A method for writing servo patterns on a hard disk drive disk according to claim 13, further comprising the steps of positioning said head at additional positions for the writing of further servo patterns, determining further tracks in said layers of magnetic medium, and writing said further servo patterns determining said further tracks displaced from said reference track;

using said head to position said actuator arm at a second fixed position over a temporary reference track determined by said servo patterns written by said head; and while maintaining said actuator arm at said second fixed position, positioning said head at additional positions for the writing of further servo patterns and writing said further servo patterns determining further tracks displaced from said temporary reference track.

15. A method for writing servo patterns on a disk in a hard disk drive assembly, said assembly comprising a disk having at least one recordable surface in which a reference pattern has been written, determining a reference track, an actuator having a shaft engaged with said disk to provide rotational motion to said disk, an actuator arm having a movable end capable of radial movement across said disk, a first micro-actuated read/write head on the movable end of said actuator arm, and a second micro-actuated read/write head on the movable end of said actuator arm capable of displacement relative to said actuator arm, and comprising the steps of:

using said first read/write head to position said actuator arm at a first fixed position over said reference track;

maintaining said actuator arm at said first fixed position while displacing said second read/write head and using said displaced second read/write head to write a second servo pattern, determining a second track displaced from said reference track.

16. A method for writing servo patterns on a disk in a hard disk drive assembly, said assembly comprising a plurality of disks each having at least one recordable surface in at least one of which a reference pattern has been written, determining a reference track, an actuator having a shaft engaged with said disk to provide rotational motion to said disks, a first actuator arm having a movable end capable of radial movement across one of said disks, a second actuator arm having a movable end capable of radial movement across another one of said disks, a first micro-actuated read/write head on the movable end of said first actuator arm, and a second micro-actuated read/write head on the movable end of said second actuator arm capable of displacement relative to said actuator arm, and comprising the steps of:

using said first read/write head to position said first actuator arm at a first fixed position over said reference track, establishing a second fixed position for said second actuator arm;

maintaining said second actuator arm at said second fixed position while displacing said second read/write head and using said displaced second read/write head to write a second servo pattern, determining a second track displaced from said reference track.

\* \* \* \* \*